350-3.78 SR

XR 3,678,472

X 3049 W

United Stat

Bass et al.

[15] 3,678,472

[45] July 18, 1972

[54] DATA STORAGE ARRANGEMENTS

[72] Inventors: John C. Bass, Northampton; Peter Waterworth, Bugbrooke, both of England

[73] Assignee: The Plessey Company Limited, Ilford, Essex, England

[22] Filed: May 13, 1970

[21] Appl. No.: 36,734

[30] Foreign Application Priority Data

May 19, 1969 Great Britain........................25,489/69

[52] U.S. Cl...........................................340/173 LT, 350/3.5

[51] Int. Cl...........................................................G11c 13/04

[58] Field of Search................340/173 LT, 173 SS, 173 MA, 340/173 CR; 235/61.11 E, 61.11 R; 350/3.5; 250/219 R, 219 A, 219 DD; 179/100.3

[56] References Cited

UNITED STATES PATENTS 3,229,047 1/1966 Simpson..........................340/173 MA

*Primary Examiner*—Daryl W. Cook

*Attorney*—Blum, Moscovitz, Friedman & Kaplan

[57] ABSTRACT

A data storage arrangement in which information is stored in the form of a plurality of juxtaposed holograms in which a pulsed light beam is caused to successively traverse the holograms, it being arranged that the light beam pulsates at a frequency corresponding to the time period taken to make one traverse of the holograms, the relative position of the light beam pulse during said period being variable so that the light beam illuminates a certain one of said holograms for the purpose of reading out information stored therein.

12 Claims, 1 Drawing Figure

3678472

OR IN 340/173LT

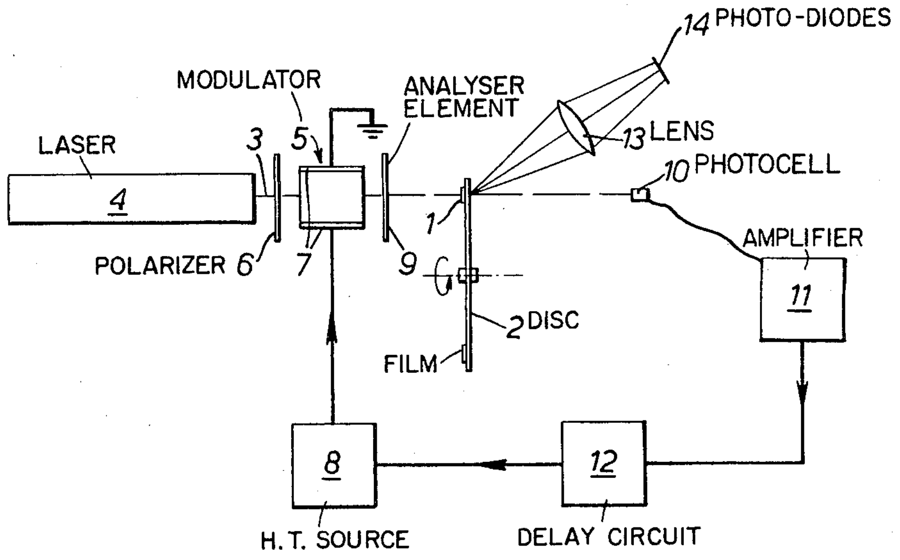
14 PHOTO-DIODES
MODULATOR
ANALYSER ELEMENT
13 LENS
LASER
3
5
10 PHOTOCELL
4
1
AMPLIFIER
POLARIZER 6
7
9
11
2 DISC
FILM
8
12
H.T. SOURCE
DELAY CIRCUIT

DATA STORAGE ARRANGEMENTS

This invention relates to data storage arrangements.

According to the present invention, a data storage arrangement comprises means for storing information in the form of a plurality of juxtaposed photo-recorded elements e.g. holograms and means for causing a pulsed light beam to successively traverse said elements, it being a pulsed arranged that the light beam pulsates at a frequency corresponding to the time period taken to make one traverse of said elements.

Preferably the duration of the light beam pulse will be such as to cause one of the photo-recorded elements to be illuminated, for the purpose of reading out information stored therein and the relative position of the light beam pulse during each complete traverse of the photo-recorded elements is variable for causing a selected one of said elements to be illuminated.

In carrying out the invention when information is stored in the form of holograms, the light beam may be afforded by a laser, in which case the laser beam may be arranged to pulsate by Q-switching the laser or alternatively by modulating the laser light beam.

In one arrangement in which the laser light beam is modulated there may be provided modulating means to which the laser light beam is fed, the modulating means including polarizing means for polarizing the laser light beam, electro-optic switch means and an analyzer element which is sensitive to the plane of polarization of the light beam, the electro-optic switch means being effective for causing the plane of polarization of the polarized light beam to be rotated so that is is passed or blocked by said analyzer element dependent upon the plane of polarization of the light beam from said switch means.

In one arrangement according to the invention the laser light beam may be caused to traverse the plurality of holograms by arranging that the holograms are moved and the light beam is maintained stationary. In an alternative arrangement the laser light beam may be caused to be deflected, as by using a spinning mirror, the laser and the holograms being maintained stationary.

In a preferred arrangement it will be arranged that the plurality of holograms be carried and arranged circumferentially on a rotatable plate, said holograms being individually illuminated by means of a stationary modulated laser light beam. In such arrangement in order to achieve synchronism between the rotation of the rotatable plate and the modulation of the light beam there may be generated a reference pulse corresponding to a predetermined position of said plate, the reference pulse being used to cause the laser light beam to be modulated, there being provided delay means for delaying said reference pulse for the purpose of causing a particular one of said holograms to be illuminated.

A data storage arrangement according to the invention may further comprise read-out means for reading-out information stored in the illuminated hologram, the read-out means conveniently comprising photo-sensitive means onto which the illuminated hologram is focussed, as by a lens system, the photo-sensitive means being arranged to be scanned to afford an electronic signal corresponding to the information stored in the illuminated hologram. The photo-sensitive means may take the form of a photo-diode array, e.g. of silicon or alternatively may be a vacuum camera tube which is sensitive to the light of the light beam.

The foregoing and other features of the invention will now be described by means of an exemplary embodiment, in which reference is made to the accompanying drawing, which is a partly diagrammatic, partly block schematic diagram of a data storage arrangement according to the present invention.

In the data storage arrangement to be described, information either in analogue form e.g. characters or drawings or in binary form e.g. in dot matrix is stored in a photographic plate or film in the form of small holograms. The stored information is read out by illuminating the required hologram with laser light, which reconstructs the optical information as an image in its original optical form. This image is then translated into electronic form by means of photo-sensors.

Turning now to the data storage arrangement shown in the drawing, a plurality of uniformly spaced photographic films or plates 1, each containing a hologram are arranged around the periphery of a disc 2 which is caused to be rotated at a high speed. The individual holograms may typically be about one-half mm. square in size, and several circular tracks may be provided at different radii on the disc. The information stored in the holograms is accessed by means of a laser beam 3 derived from a laser 4, it being arranged that the laser beam is modulated "on" and "off" at the rotation rate of the disc 2. This is achieved by means of a modulator arrangement which includes an electro-optic switch shown generally at 5. In this way only one of the holograms is illuminated each time the disc makes one complete rotation. Thus over a number of rotations of the disc 2, the illuminated hologram appears stationary with respect of the laser beam. As an alternative to using an electro-optic switch for modulating the laser beam, acousto-optical deflectors, piezo-electrically operated or mechanically operated mirror systems may also be used and access to multiple tracks of holograms on the disc 2 at different radii may be provided by similar deflection techniques.

In order to cause the laser beam 3 to be modulated "on" and "off," it is first polarized by passing it through a polarizer 6 and is then passed between two parallel plates 7 between which a pulsating electric field is set up. The electric field set up between the plates 7 is derived from a source of high tension 8 and causes the polarized light beam to be rotated in dependence upon the intensity of the electric field. Thus, for example, it may be arranged that when there is no electric field the polarized laser beam will pass between the plates 7 unaffected and when an electric field is present the polarized laser beam will be caused to rotate, say 90°. After passage between the plates 7 and the laser beam is passed through an analyzer element 9 which only passes light having a particular polarization, is being arranged, for example, that the laser beam is passed by the analyzer element 9 when it is unaffected by the electric field set up between the plates 7, and is blocked when it is caused to be rotated by the electric field. Thus the laser beam emanating from the analyzer element 9 is caused to be switched "on" and "off."

In order to ensure synchronism between the rotation of the disc 2 and the switching "on" and "off" of the laser beam, a marker pulse is generated at a particular point on the disc 2 this marker pulse being generated optically as shown by means of photocell 10 or by other means e.g. by magnetic pick-off. The marker pulse from the photocell 10 is then used to determine the switching "on" and "off" of the electric field set up between the plate 7 and consequently to determine the switching "on" and "off" of the laser beam. In order to be able to provide access to a particular hologram it is arranged that the marker pulse is applied, after amplification in amplifier 11, to an electronic delay circuit 12, the delayed pulse then being applied to the source of high tension 8 which is caused to pulsate in synchronism with the delayed pulse. In this way by varying the delay of the delay circuit 12 it may be arranged that a particular hologram is illuminated for read-out purposes.

In order to read out the information stored in an illuminated hologram, the reconstructed image is focussed, by means of lens 13, on to a photo-sensor arrangement consisting of an array of photo-diodes 14. The array of photo-diodes may then be scanned, using known techniques, in order to obtain an electronic (digital) signal corresponding to the stored information. As an alternative to providing an array of photo-diodes, the photo-sensor arrangement may conveniently consist of a vacuum camera tube which is sensitive to the laser light. This again may be scanned in known manner to afford an electronic signal. As a further alternative, information could be read out photographically by arranging that the reconstructed image falls on a moving photo-sensitive plate or film. This embodiment would find application in printing of data or characters.

In order to ensure that there is no smearing of the hologram image when the latter is focussed on to the photo-sensor arrangement, it is preferably to arrange that the holograms are recorded with parallel laser light so that the reconstructed images are formed at infinity.

An alternative data storage arrangement to the one described above may have the holograms arranged along concentric tracks on a stationary plate. The laser beams may be made to scan such a track by means of a plane mirror spinning about an axis passing through the plane of the tracks, so that the laser beam is deflected and rotated to access each hologram in turn. This system would have an advantage in that the photographic amulsion of the plates would not be subject to centrifugal forces. A further possibility would be to record the holograms as tracks on a strip of film which could be wound round a hollow drum. The laser beam could then be introduced inside the drum and suitably deflected on to the film strip.

As an example of the capacity of a typical system, considering a 10 inch disc rotating at 30,000 revolutions per minute, using holograms of ½ mm. square size, there would be 800 in a single track around the periphery of the disc. Each hologram could contain $10^4 - 10^5$ bits of binary information, so that the total storage is up to $10^8$ bits. Thus, each hologram of $10^4$ bits is illuminated for 6 micro-seconds. Photo-diodes in a typical self-scanning array require $10^{-12}$J of light to operate and thus a laser power of about 50 milli-watts would be required for hologram reconstruction.

This system is an alternative to a disc or tape store providing page access of a few milli-seconds to information blocks of $10^4$ bits or more which can be scanned at megabit rates using present techniques.

WHAT WE CLAIM IS:

1. A data storage arrangement comprising storage means in which information is stored in the form of a plurality of juxtaposed holograms, a laser light source for affording a pulsed light beam, and means for causing said pulsed light beam to successively traverse the holograms of the storage means, the light beam being arranged to pulsate once every complete traverse of said holograms the duration of the light beam pulse being such that one or more of said holograms is illuminated each traverse for read-out purposes, and read-out means for detecting an interference pattern resulting from the illumination of said one or more holograms.

2. A data storage arrangement as claimed in claim 1, in which the relative position of the light beam pulse during each complete traverse of the holograms is variable for causing a selected one of said holograms to be illuminated.

3. A data storage arrangement as claimed in claim 1, in which the laser is Q-switched to cause the light beam to pulsate.

4. A data storage arrangement as claimed in claim 1, in which the light beam from the laser is modulated to cause it to pulsate.

5. A data storage arrangement as claimed in claim 4, comprising modulating means to which the laser light beam is fed, the modulating means including polarizing means for polarizing the laser light beam, electro-optic switch means and an analyzer element which is sensitive to the plane of polarization of the light beam, the electro-optic switch means being effective for causing the plane of polarization of the polarized light beam to be rotated so that it is passed or blocked by said analyzer element dependent upon the plane of polarization of the light beam from said switch means.

6. A data storage arrangement as claimed in claim 1, in which the laser light beam is caused to traverse the plurality of holograms by arranging that the holograms are moved and the light beam is maintained stationary.

7. A data storage arrangement as claimed in claim 1, in which the laser light beam is caused to traverse the holograms by arranging that the light beam is deflected, the laser and the holograms being maintained stationary.

8. A data storage arrangement as claimed in claim 1, in which the plurality of holograms are arranged circumferentially on a rotatable plate, said holograms being individually illuminated by means of a stationary modulated laser light beam.

9. A data storage arrangement as claimed in claim 8, in which in order to achieve synchronsim between the rotation of the rotatable plate and the modulation of the light beam, there is generated a reference pulse corresponding to a predetermined position of said plate, the reference pulse being used to cause the laser light beam to be modulated, there being provided delay means for delaying said reference pulse for the purpose of causing a particular one of said holograms to be illuminated.

10. A data storage arrangement as claimed in claim 1, comprising read-out means for reading out information stored in the illuminated hologram, the read-out means comprising photo-sensitive means onto which the illuminated hologram is focused.

11. A data storage arrangement as claimed in claim 10, in which the photo-sensitive means is scanned to afford an electronic signal corresponding to the information stored in the illuminated hologram.

12. A data storage arrangement as claimed in claim 10, in which the photo-sensitive means takes the form of a photo-diode array.

* * * * *